United States Patent Office 3,533,960
Patented Oct. 13, 1970

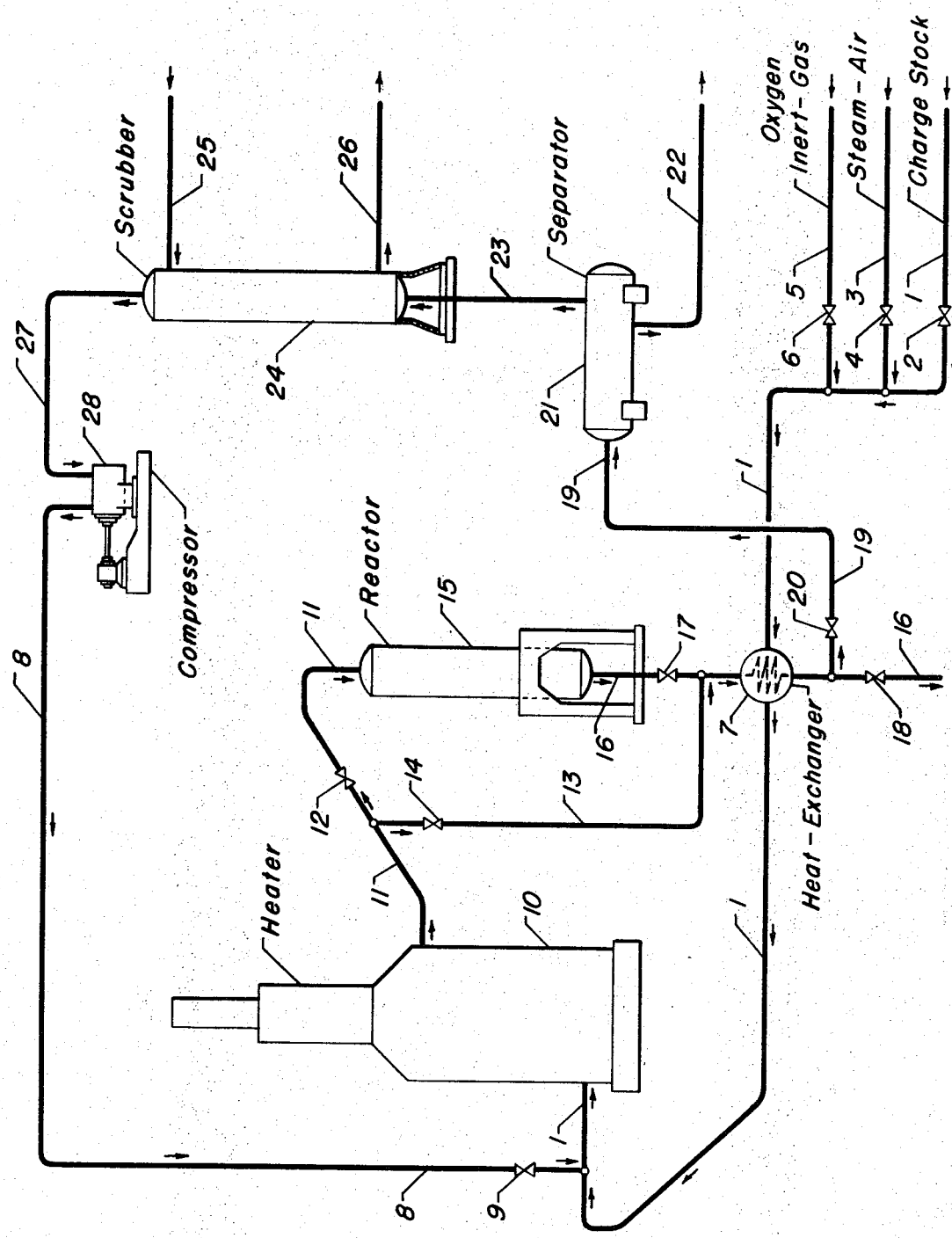

3,533,960
REGENERATION OF SULFUR - CONTAMINATED CARBONIZED CATALYST SUBSEQUENT TO SULFIDE SCALE REMOVAL FROM HEATER
Peter C. Weinert, Deerfield, Ill., assignor to Universal Oil Products Company, Des Plaines, Ill., a corporation of Delaware
Continuation-in-part of application Ser. No. 360,260, Apr. 16, 1964. This application Oct. 6, 1967, Ser. No. 697,248
Int. Cl. B01j 11/06
U.S. Cl. 252—419          8 Claims

ABSTRACT OF THE DISCLOSURE

A process for the oxidative regeneration of a "sulfur-service" catalytic composite employed in a system having a charge heater in direct, open communication with a conversion zone containing the catalytic composite. Prior to contacting the deactivated catalyst with oxygen, the charge heater is isolated from the conversion zone. The scaled deposits of metallic disulfides are removed from the heater to prevent sulfate formation on the catalyst.

RELATED APPLICATIONS

The present application is a continuation-in-part of my copending application, Ser. No. 360,260, filed Apr. 16, 1964, now abandoned, all the teachings of which are incorporated herein by specific reference thereto.

APPLICABILITY OF INVENTION

The subject matter of this application involves the regeneration of catalytic composites which have become deactivated as a result of a prolonged period of use in a hydrocarbon conversion process system. More specifically, the present invention is directed toward a method for the oxidative regeneration of a catalytic composite comprising an alumina-silica carrier material, which catalytic composite has become carbonized during its use, and which is further contaminated by the deposition of exceedingly large quantities of sulfur. The various catalytic composites to which the regeneration method described herein is most adaptable are those composites utilized in a process for the hydrorefining and/or hydrocracking of hydrocarbons and mixtures thereof, and which are composites of an alumina-silica, or alumina carrier material and at least one metallic component selected from the metals of Groups VI–B and VIII of the Periodic Table, and compounds thereof.

The present invention affords an improvement in the oxidative regeneration of catalytic composites which have been deactivated during use in a hydrocarbon conversion process system comprising a reaction zone, containing said catalytic composite, and a charge heater in direct, open communication with said reaction zone and upstream therefrom.

Hydrorefining, which may be defined as a process for treating various hydrocarbon distillates or fractions, and/or substantially pure hydrocarbons, for the purpose of removing various contaminants therefrom, is rather well known and well defined within the prior art. Hydrorefining processes are primarily concerned with the removal of nitrogenous and sulfurous compounds which deleteriously affect a subsequent process to which the hydrocarbon mixture may be subjected. In a catalytic hydrorefining process, the sulfurous and nitrogenous compounds are converted into hydrogen sulfide, ammonia and hydrocarbons. Hydrorefining processes are often utilized for the removal of these and other contaminating influences from hydrocarbon fractions possessing relatively low boiling ranges, and particularly to the treating of gasoline boiling range hydrocarbon fractions which are thereafter employed as charge stocks to a catalytic reforming process. Various kerosene or mixed naphtha fractions are treated in order to provide a more suitable fuel oil; that is, one not having the tendency to produce oxides of sulfur upon combustion. Hydrorefining processes have found widespread use in the treating of petroleum-derived hydrocarbon fractions of the middle-distillate boiling range and above. Generally these heavier hydrocarbon fractions are thereafter utilized as charge stocks to hydrocracking processes for the purpose of producing lower-boiling kerosene and gasoline boiling range fractions. Such heavier hydrocarbon fractions include light and heavy gas oils, lubricating oil and while oil stocks, black oil and cycle oil stocks, vacuum gas oils, etc. The degree of contamination within such heavier hydrocarbon fractions is significantly higher than in gasoline boiling range hydrocarbons, being as high as about 3.0% to about 5.0% by weight of sulfur, and from about 1000 p.p.m. to about 5000 p.p.m. of nitrogen.

In general, a hydrorefining process is conducted by admixing the hydrocarbon charge stock with hydrogen in an amount within the range of from about 1000 to about 10,000 s.c.f./bbl. of liquid hydrocarbon charge. This mixture is then raised to a temperature within the range of about 500° F. to about 1200° F., and contacts a suitable catalytic composite at a liquid hourly space velocity (defined as volumes of liquid charge per hour per volume of catalyst disposed within the reaction zone) within the range of from about 0.25 to 15.0. At these conditions, and under an imposed pressure of about 100 to about 3,000 p.s.i.g, the organically-bound nitrogenous compounds are separated at the nitrogen-carbon bonds to form ammonia. The sulfurous compounds, such as mercaptans, thiophenes, and higher-boiling sulfurous compounds are converted into hydrogen sulfide and the correponding sulfur-free hydrocarbon. In many instances, partially dependent upon the precise character of the catalytic composite employed, a desirable degree of hydrocracking occurs whereby the heavier molecular weight hydrocarbons, boiling at a temperature above about 700° F., are converted into hydrocarbons boiling below about 700° F., although without the attendant production of unusually excessive quantities of light, straight-chain paraffinic hydrocarbons. The precise operating conditions will, of course, depend to a great extent upon the physical and/or chemical characteristics of the particular hydrocarbon charge stock.

The hydrorefining and/or hydrocracking catalyst generally consists of a composite of a refractory inorganic oxide carrier material and at least one metallic component selected from the metals and compounds of Groups VI–B and VIII of the Periodic Table. Thus, the catalystic composite will comprise a metal from the group of molybdenum, tungsten, chromium, iron, cobalt, nickel, and, in many specified instances, members of the platinum-group, particularly platinum and/or palladium. Reference is made to the Periodic Chart of the Elements, Fisher Scientific Company, 1953. One or more of these catalytically active metallic components are combined with a refractory inorganic oxide carrier material selected from the group consisting of alumina, silica, thoria, hafnia, zirconia, magnesia, strontia, mixtures of two or more, etc. The preferred catalytic composite is generally an alumina-carrier material, with from about 10.0% to about 40.0% by weight of silica, molybdenum and an iron-group metallic component. In those instances involving hydrocarbon charge stocks boiling substantially above a temperature of about 750° F., and being severely contaminated by the presence of exceedingly large quantities of nitrogenous and sulfurous compounds, the carrier material may consist of alumina and from about 10.0% to about 90.0% by weight of silica. It is understood that the precise composition of the catalyst, to be regenerated via the method herein described, is not an essential feature of my invention.

Following a prolonged period of utilization in a hydrorefining and/or hydrocracking process as above described, the catalytic composite becomes carbonized as a result of the deposition of coke and other heavy carbonaceous material thereupon, and is further contaminated by the deposition of large quantities of sulfur. As a result, the catalytic composite becomes deactivated and incapable of effecting the necessary, desired degree of removal of contaminating influences, or the intended yield of lower-boiling hydrocarbon products. It is recognized that the prior art relating to catalysis, particularly as utilized within the petroleum industry, is replete with a wide variety of methods employed in the regeneration of various catalytic composites. The greater majority of these methosd utilize an oxygen-containing atmosphere at elevated temperatures for the purpose of oxidizing, or burning, the coke and carbonaceous material from the catalyst. Such prior art methods are, however, not cognizant that particular precautions must be taken, and speical techniques be observed when the carbonized catalytic composite is severely contaminated by the deposition of sulfur. Furthermore, the prior art references do not appear to be aware of the difficulties arising as a result of the deposition of metallic disulfide scale within the appurtenances attendant the reaction zone in which the catalytic composite is deposited. During regeneration, in which the regenerating gases are brought to the desired temperature in a heater, flowing therefrom through the catalytic composite disposed in the reaction zone, the metallic disulfides are converted to metallic sulfides and sulfurous oxides, particularly sulfur dioxide, which products are carried into the reaction zone to come into contact with the catalytic composite effecting the deposition of sulfates thereupon. The removal of a sulfate contaminant from the catalyst becomes an extremely tedious and involved operation in and of itself; without removal, the ultimate activity of the regenerated catalytic composite is adversely influenced .

OBJECTS AND EMBODIMENTS

The object of the present invention is to provide a method for the succesful regeneration, or reactivation, of a carbonized catalytic composite, and contaminated by sulfur, of the type utilized in the above-described hydrocarbon conversion processes. Therefore, a broad embodiment of the present invention relates to an improvement in a process for the oxidative regeneration of a deactivated, carbonized catalytic composite of a refractory inorganic oxide carrier material and at least one metallic component selected from the metals and compounds of Groups VI–B and VIII of the Periodic Table, and contaminated by sulfur, which catalytic composite has become deactivated during use in a conversion process system comprising a reaction zone, containing said catalytic composite, and a charge heater in open communication with said zone upstream therefrom, said heater containing a scaled deposit of a metallic disulfide, which improvement comprises the steps of: (a) isolating said reaction zone from said charge heater and raising the temperature within the latter to a level above about 1000° F., (b) introducing steam into said heater and removing loose metallic disulfide scale therefrom; (c) admixing an oxygen-containing gas with said steam and burning said scaled metallic disulfide at a temperature in the range of about 1200° F. to about 1400° F. to form metallic sulfide and sulfuorous oxide, and flushing said metallic sulfide from said process system; (d) when said heater is substantially free from deposits of scaled metallic disulfides, discontinuing the flow of steam therethrough while lowering the temperature thereof to below about 1000° F.; (e) after the temperature within said heater is below about 1000° F., discontinuing the flow of said oxygen-containing gas and placing said heater in open communication with said reaction zone; (f) oxidizing said catalytic composite with a circulating stream of regenerating gas containing free oxygen, said regenerating gas passing through said heater and said reaction zone; and (g) treating the effluent regenerating gas to remove oxides of sulfur therefrom, and recirculating the treated regenerating gas through said composite.

Another broad embodiment of the present invention involves an improvement in a process for the oxidative regeneration of a deactivated, carbonized hydrorefining catalyst susceptible to loss of activity by sulfur and steam, which catalyst has become deactivated during use in a hydrorefining process system comprising a reaction zone, containing a bed of said catalyst, and a charge heater in open communication with said zone upstream therefrom, said heater containing a scaled deposit of a metallic disulfide, the improvement which comprises the steps of: (a) isolating said reaction zone from said charge heater; (b) passing a mixture of steam and an oxygen-containing gas through the heater, therein heating said mixture to a temperature in the range of about 1200° F. to about 1400° F., burning said scaled metallic disulfide at the last-menioned temperatures to form metallic sulfide and sulfurous oxide, and flushing said metallic sulfide from said process system; (d) when said heater is substantially free from deposits of sealed metallic disulfide, discontinuing the flow of said mixture therethrough and placing the heater in open communication with said reaction zone; and (d) passing through said heater a stream of regenerating gas consisting essentially of a mixture of free oxygen and an inert gas, therein heating said stream to a temperature below about 1000° F. and passing the thus heated stream through said reaction zone to regenerate said catalyst.

A specific embodiment, encompassed by the present invention, involves an improvement in a process for the oxidative regeneration of a deactivated, carbonized catalytic composite of alumina, silica, molybdenum and nickel, and contaminated by sulfur, which catalytic composite has become deactivated during use in a conversion process system comprising a reaction zone, containing said catalytic composite, and a charge heater in open communication with said zone upstream therefrom, said heater containing a scaled deposit of iron disulfide, which improvement comprises the steps of: (a) isolating said reaction zone from said charge heater and raising the temperature within the latter to a level within the range of from about 1200° F. to about 1400° F.; (b) introducing steam into said heater and removing loose iron disulfide scale therefrom; (c) admixing air with said steam and burning said scaled iron disulfide to form iron sulfide and sulfurous oxides, continuously removing said iron sulfide and sulfurous oxides from said process system; (d) when said heater is substantially free from deposits of scaled iron disulfide, discontinuing the flow of steam therethrough while lowering the temperature thereof to below 700° F.; (e) after the temperature within said heater is below about 700° F., discontinuing the flow of air and placing said heater in open communication with said reaction zone; (f) oxidizing said composite with a circulating stream of regeneratng gas, containing from about 0.5 to about 1.5 mol percent of free oxygen, at an inlet temperature within the range of from about 550° F. to about 700° F., and selected to produce a first burning wave through said composite having a maximum temperature increase of about 200° F. and to oxidize the sulfur contaminant on said catalytic composite to oxides of sulfur by contact with oxygen in the regenerating gas; (g) treating the effluent regenerating gas with an aqueous, alkalinous solution having a pH greater than about 7.0, and recirculating the resulting sulfur oxide-free regenerating gas through said catalytic composite; (h) following the passing of said first burning wave through said composite, increasing the inlet temperature to a level within the range of from about 700° F. to about 850° F., to produce a second burning wave through said composite, maintaining the free oxygen concentration within the aforesaid range, and continuously removing oxides of sulfur from said regenerating gas; and, (i) following the passing of said second burning wave through said composite, increasing the inlet temperature to a level within the range of about 1000° F. to about 1100° F., and the concentration of oxygen within the regenerating gas is increased to a level within the range of about 3.0 to about 4.5 mol percent, and continuing the circulation of the regenerating gas at the higher temperature.

From the foregoing embodiments, it is noted that the regeneration method encompassed by the present invention is particularly adaptable to a deactivated, carbonized catalytic composite of at least one metallic component from Groups VI–B and VIII of the Periodic Table and a siliceous, alumina-containing carrier material. The following list of specific catalysts exemplifies those catalytic composites which may be utilized in a process of hydrorefining and/or hydrocracking various petroleum distillates and/or hydrocarbon fractions, and in combination processes involving, for example, single and multiple-stage hydrorefining and hydrocracking. The stated concentrations of the catalytically active metallic components are computed on the basis of the elemental metal, notwithstanding that the same may exist within the finished catalyst in some combined form. Carbonized, deactivated catalysts which may be regenerated to an unusually high degree of catalytic activity include the following: 5.0% by weight of nickel composited with a carrier material consisting of 75.0% by weight of silica and 25.0% by weight of alumina; 1.8% by weight of nickel and 16.0% by weight of molybdenum composited with a carrier material of 12.0% by weight of silica and 88.0% by weight of alumina; 1.8% by weight of nickel and 16.0% by weight of molybdenum composited with a carrier material of 63.0% by weight of alumina and 37.0% by weight of silica; 0.05% by weight of cobalt, 4.2% by weight of nickel and 11.3% by weight of molybdenum composited with a carrier material of 88.0% by weight of alumina and 12.0% by weight of silica; 0.4% by weight of platinum composited with a carrier material of 63.0% by weight of alumina and 37.0% by weight of silica; 2.2% by weight of nickel, 5.7% by weight of molybdenum composited with an alumina carrier material; and, 0.4% by weight of platinum composited with a carrier material of 12.0% by weight of silica and 88.0% by weight of alumina. The catalytic composites which may be regenerated in accordance with the method of the present invention, some of which catalytic composites have been hereinabove described, may be manufactured by any suitable means which produces a catalytic composite capable of effecting the desired, intended result. It is understood that a particular method of preparing such catalytic composite is not a feature limiting the scope of the regeneration method described herein.

Hydrorefining and/or hydrocracking processes are generally conducted in a manner which utilizes one or more fixed-bed catalyst-containing reaction zones. Furthermore, the catalytic composites are specifically prepared for processing of a charge stock having particular chemical and/or physical characteristics, and to achieve a particularly desired end result. Through the use of carefully controlled operating conditions and processing techniques, an acceptable, efficient process is generally effected for an extended period of time. However, as with virtually all catalytically-conducted processes, there exists an inherent naturally-occurring degree of deactivation of the catalytic composite. The catalytic composite employed will ultimately attain a level of deactivation as a result of the natural deterioration of the catalytically active metallic component, the deposition of coke and other heavy hydrocarbonaceous material, often accelerated as a result of the severe operating conditions necessitated by the desired end result, and the deposition of excessive quantities of sulfur. As hereinbefore stated, the primary object of the present invention is to provide a method for the regeneration of catalytic composites utilized in a process for the hydrorefining and/or hydrocracking of petroleum-derived charge stocks. The regeneration method described herein is especially adaptable to the reactivation of catalytic composites which have been deactivated as a result of the deposition of coke and sulfurous material.

DESCRIPTION OF DRAWING

The improvement afforded through the use of the present invention is readily understood by reference to the accompanying figure. It is understood that the drawing is solely for illustrative purposes. With reference to the drawing, in which miscellaneous valves, controls, heaters, condensers, knock-out pots, etc., have been eliminated as not being pertinent to a clear understanding of the present invention, there is illustrated a reactor, or reaction zone, a heater in open communication therewith and upstream therefrom, a heat-exchanger, a vapor-liquid separator, a recycle-gas scrubber, and a compressor. The schematic flow diagram is typical of those generally employed in the hydrorefining and/or hydrocracking of petroleum distillate fractions. Thus, the hydrocarbon charge stock enters the system through line 1 containing valve 2, passes through heat-exchanger 7 and into heater 10. Heat-exchanger 7 is employed to utilize the hot reaction product effluent, leaving reactor 15 via line 16 containing valve 17, for the purpose of decreasing the heat-load required by charge heater 10. Just prior to entering heater 10, the liquid charge in line 1 is admixed with recycle hydrogen from line 8 containing valve 9, the mixture passing through line 11 containing valve 12 into reactor 15. During processing of the hydrocarbon charge stock entering line 1, valve 14 in line 13, and valve 18 in line 16 are closed. The total product effluent from reactor 15 passes through line 16, containing valve 17, through heat-exchanger 7 to supply heat to the incoming charge stock, continuing through line 19, containing valve 20, into a high-pressure separator 21. Separator 21 is generally maintained under the same pressure as exists in reactor 15, however, at a significantly lower temperature. Normally liquid hydrocarbons are removed from separator 21 via line 22, and, in most hydrocarbon process systems are transmitted to one or more fractionating zones. A hydrogen-rich gas phase is removed from separator 21 via line 23, passes through scrubber 24 and line 27 into compressor 28, the latter discharging through line 8 containing valve 9 to combine with the liquid charge stock in line 1.

Although indicated as a scrubber for the purposes of this particular illustration, vessel 24 may be any means by which various gaseous components other than hydrogen are removed from the recycle gas stream entering through line 23 and leaving through line 27. Lines 25 and 26 are utilized to supply the medium employed to remove the various gaseous contaminants from the process system. In the case of hydrorefining and/or hydrocracking process systems, scrubber 24 is utilized for the purpose of removing ammonia, hydrogen sulfide, and light paraffinic components including methane, ethane and propane from the hydrogen-rich recycle gas stream.

As hereinbefore stated, the prior art methods of regenerating the carbonized catalytic composite employed in a conversion process system as above described, involve the use of an oxygen-containing gas stream, either oxygen and an inert gas, or air with or without an inert gas, at varying temperature levels. As hereinafter indicated in greater detail, it has recently been found that the regeneration of a catalytic composite contaminated by excess deposition of coke and sulfurous material, to an activity level closely approaching activity of the fresh catalyst, must be carried out at particular temperature levels and specific oxygen concentrations. It has further been found that the recirculated regenerating gas stream must be treated, or scrubbed, with an aqueous, alkalinous solution having a pH greater than about 7.0, for the purpose of removing sulfur dioxide prior to reintroduction in contact with the catalytic composite being regenerated. In any event, the present-day methods of regeneration utilize charge heater 10 for the purpose of heating the regenerating gas to the desired temperature prior to passing the same through the catalytic composite disposed in reaction zone 15. The effluent regenerating gases pass out of the reaction zone, through high-pressure separator 21 being withdrawn therefrom via compressor 28. The treatment of the regenerating gas is intended to eliminate, or substantially reduce the quantity of sulfur dioxide coming into contact with the catalytic composite, otherwise being contaminated through the formation of sulfates, which material adversely influences the resulting activity of the regenerated catalyst.

Notwithstanding the treatment of the recirculating regenerating gas, a substantial quantity of sulfur dioxide is caused to pass over the catalyst disposed within the reaction zone. This sulfur dioxide results from the burning of various metallic sulfides in the charge heater upstream from the reaction zone, and the heat-exchanger generally situated in the reaction zone effluent line, and particularly the burning of iron disulfide, thereby forming iron sulfide and sulfur dioxide. The improvement encompassed by the present invention is intended to eliminate the accumulation of sulfates on the catalytic composite as a result of the sulfur dioxide formed by the burning of metallic disulfides appearing as scale in the charge heater and/or the heat-exchanger.

With reference once again to the accompanying figure, after an extended period of operation in which the catalytic composite has become carbonized, and contaminated by the deposition of sulfur, the charge heater 10 is isolated from reactor 15 by closing valve 12 in line 11 and valve 17 in line 16; valve 9 in line 8, and valve 20 in line 19 are also closed, thereby effectively removing separator 21, scrubber 24 and recycle gas compressor 28 from the system. The temperature in heater 10 is raised to a level above about 1000° F., and preferably within the range of from about 1200° F. to about 1400° F., higher temperatures having the tendency to detrimentally affect the metallurgical characteristics of the heater tubes, and a mixture of steam and air is introduced into the system through line 3 containing valve 4. It is preferred to introduce steam initially in the absence of air, whereby the steam passes via line 1 through heat-exchanger 7, and into heater 10 thereby flushing loose iron disulfide scale therefrom. The steam and loose scale passes through line 11 and, via valve 14, through line 13 into line 16, again passing through heat-exchanger 7, and is removed from the system via line 16 containing valve 18. Air is slowly introduced in admixture with the steam entering the regenerating system via line 3 containing valve 4. As conversion of the scaled iron disulfide in the charge heater and both sides of heat-exchanger 7 takes place, close observation is made to insure that the temperatures within the charge heater do not exceed a level of about 1400° F. Evidence of iron disulfide scale conversion can be obtained by noting the exit gases, which will have a brownish color, or the steam condensate which will be somewhat cloudy; also, there will be noted a reduction in the oxygen/nitrogen ratio in the off-gas stream. It is preferred not to attempt a complete conversion of all the iron disulfide scale in a single, continuous flow of steam and air through the system. Cycles of air and steam purging should be employed, since this will cause the removal of loosened particles of scale, thereby eliminating the necessity of burning all the metallic disulfides.

Air flow is again admixed with the steam, proceeding as above described with an increase of the air flow period by increments of about fifteen minutes until reaching a period of about one hour. The alternate conversion and purging with approximately one-hour burning periods is preferred, and continues until the outlet streams give evidence that the reaction of the disulfides has been completed. Evidence in this regard will be the color of the outlet steam condensate and the absence of sulfur dioxide in the exit gas stream, as well as the oxygen/nitrogen ratio of the exit gas stream.

Although the flow of steam through line 3 is discontinued, while the temperature in charge heater 10 is being decreased to a level below about 1000° F., the flow of air is continued. When the temperature within the heater reaches the desired level, the flow of air is discontinued, and heater 10 placed in open communication with the reaction zone by opening valves 9, 12, 17 and 20, valves 14 and 18 being closed.

SUMMARY OF THE INVENTION

The improvement hereinbefore described is adaptable to any method utilizing oxidative regeneration of a catalytic composite contaminated by sulfur. For example, many procedures employ a two-step scheme in which two separate temperatures are utilized. The catalyst is first regenerated at a lower temperature of from about 500° F. to about 800° F., and thereafter at an elevated temperature in the range of from about 600° F. to about 900° F. Other methods incorporate the control of oxygen content of the regenerating gas; that is, the catalyst is initially contacted with from 0.5 to 1.0 mol percent oxygen at a temperature of 550° F., which temperature is gradually increased to 650° F. After a burning wave has passed through the catalyst, the temperature of the regenerating gas is increased to about 750° F., but the oxygen content thereof is generally maintained at the same level.

As hereinafter indicated in a specific example, one particular method is especially preferred for use in conjunction with the aforesaid improvement. With reference once again to the drawing, after heater 10 and heat-exchanger 7 have again been placed in direct open communication with reactor 15, an inert gas, preferably nitrogen, containing from about 0.5% to 1.5% of oxygen, is introduced through line 5 containing valve 6, passing into line 1. This regenerating gas stream passes through heater 10 wherein the same is heated to a temperature at which a large proportion of carbon and sulfur is removed. The regenerating gas, at a temperature within the range of from about 550° F. to about 700° F., passes through line 11 containing valve 12 into reactor 15; the precise temperature of the regenerating gas stream is selected to produce a burning wave, in an adiabatically-maintained catalyst bed, having a maximum temperature increase of about 200° F. The maximum temperature increase is measured between the inlet and outlet of the catalyst bed. The lower the temperature and concentration of oxygen at which carbon and sulfur is initially removed from the catalytic composite disposed in reactor 15, the higher the resulting regenerated catalyst activity. It is essential that the oxides of sulfur, resulting from the oxidative regeneration of the catalytic composite, be removed from the regenerating gas stream prior to being recycled. Therefore, the regenerating gaseous effluent leaving reactor 15 via line 16 and valve 17, is passed through line 19, containing valve 20 into separator 21. Any entrained liquid is removed from separator 21 via line 22, the gaseous phase continuing through line 23 into scrubber 24. The purpose of scrubber 24 is to remove the oxides of sulfur, thus permitting the recirculation of a substantially sulfur oxide-free regenerating gas. Although the effluent regenerating gas may be treated in any manner capable of effecting the desired result, particularly preferred means involve the use of an aqueous, alkalinous solution having a pH greater than about 7.0, and entering scrubber 24 through line 25, the spent alkalinous solution leaving scrubber 24 via line 26. Suitable alkalinous solutions include sodium hydroxide, sodium carbonate, potassium hydroxide, etc. The sulfur oxide-free regenerating gas passes into compressor 28 via line 27, and is discharged through line 8, containing valve 9, into heater 10. The carbon dioxide, formed by the oxidation of the coke and other carbonaceous material can be employed, at least in part, an an inert material to dilute the oxygen-containing regenerating gas, and also affords a means of controlling the concentration of oxygen in the gas passing through the catalytic composite.

Under the foregoing conditions, relative to the temperature and oxygen concentration of the regenerating gas stream, a burning wave having a temperature increase of about 200° F., or less, passes through the catalytic composite. The temperature of the regenerating gas is then increased to a level within the range of about 700° F. to about 850° F., and again selected to produce a burning wave having a maximum temperature increase within the catalytic composite of about 200° F. The concentration of oxygen, within the regenerating gaseous mixture, is not increased, but remains within the range of about 0.5% to about 1.5%. The oxides of sulfur are continuously removed from the regenerating gas through the use of the aforementioned aqueous, alkalinous solution having a pH greater than about 7.0. Following the passing of the second burning wave through the catalytic composite, the temperature of the regenerating gases is raised to a level within the range of about 1000° F. to about 1100° F., and the concentration of oxygen within the regenerating gas is increased to a level within the range of about 3.0% to about 4.5%, these conditions being maintained for a period of at least about four hours.

It is realized that the foregoing description of the preferred oxidative regeneration of the catalytic composite, following the removal of metallic disulfides from the heater and heat-exchanger, is detailed and precise with respect to the temperature of the regenerating gas and the oxygen content thereof. However, just as the catalytic composite must necessarily be of a particular composition, and prepared in a specific manner, dependent upon the use for which the composite is intended, such catalytic composites require a closely controlled method of regeneration in order to achieve a degree of activity and stability which closely approximates that of the fresh catalyst.

When the above-described regeneration method is adhered to, particularly with respect to the stated temperatures and oxygen concentrations, and in conjunction with the improvement encompassed by the present invention, the need for maintaining the regenerating system in a virtually "dry" state does not exist. The catalytic composite can be effectively regenerated notwithstanding that the regenerating gas stream comprises from about 0.5% up to about 2.0% by weight of water vapor. This particular aspect is unexpected in view of the fact that an excessive concentration of steam, or water, within the regenerating gaseous medium, has the tendency to cause deactivation of alumina-silica catalytic composites through the destruction of the surface-area characteristics such that effective utilization of the catalytically active metallic components is not obtained. Furthermore, the regenerating method of the present invention is a low-pressure method, and produces highly active, regenerated catalysts at pressures from atmospheric to about 500 p.s.i.g.

The improvement encompassed by the present invention may be stated briefly as comprising a two-step method for the regenration of a catalytic composite, the first step being the utilization of steam and air, or a steam-air mixture, for the removal of metallic disulfides from the heater and heat-exchanger which comprise part of the conversion process system. The second step involves the oxidative regeneration of the catalytic composite disposed within the reaction zone, wherein the regenerating gaseous medium is heated to the desired temperature in the heater from which the metallic sulfides have been removed. For the purposes of this improvement, it is an essential feature that the reaction zone, during said first step be isolated from the remainder of the system. Since the greater proportion of conversion process systems involve a heater, a reaction zone and heat-exchanger at the outlet of said reaction zone, the removal of the reaction zone and heat-exchanger at the outlet of said reaction zone, the removal of the reaction zone is rather easily accomplished by blocking the inlet and outlet thereof, and installing a temporary line from the outlet of the heater to the inlet of the heat-exchanger. If this precaution is not taken, the utilization of steam and air passing over and through the catalytic composite disposed in the reaction zone will effectively deactivate the same to the extent that future processing is virtually precluded. Moreover, without prior removal of metallic disulfides from the heater, the use of an oxidative regeneration method wherein the oxygen-containing regenerating gas passes first through the heater, then through the reaction zone containing the catalytic composite, does not effect proper regeneration since oxides of sulfur, resulting from the burning of metallic disulfides, would be cause to pass into contact with the catalytic composite, resulting in the deposition of various sulfates. The use of air, or other oxygen-containing material, in admixture with an inert gas, to remove the metallic disulfides from the charge heater and heat-exchanger, is not feasible for numerous reasons. Although the reaction zone could be isolated from the system in such a manner that the sulfurous oxide-containing gases would pass through the scrubber, the air and inert gas being recirculated by means of the compressor, a sufficient quantity of iron oxide (rust) would be formed, not be removable from the system with the air-inert gas, and would remain to cause difficulties with the catalyst during a subsequent processing period. On the other hand, the venting of the air-inert gas stream would not be economically feasible due to the cost of large quantities of inert gas; also, the iron oxides would not be completely flushed from the system. The use of the steam-air mixture affords a flushing technique which assures removal of the iron oxide, along with sulfurous oxides and loosened disulfide scale, and possesses obvious economical advantages over air-inert gas which, as above set forth, cannot be recirculated. Steam also affords a measure of temperature control necessary to avoid run-away temperatures during the burning of the metallic scale. As hereinbefore stated, the metallurgical characteristics of the charge heater and/or heat-exchanger are such that the maximum allowable temperature therein during burning is of the order of about 1400° F.

The following examples are given to illustrate further the method of effecting the regeneration of catalytic composites in accordance with the present invention, and to indicate the benefits afforded therefrom. It is not intended to limit unduly the broad scope of the present invention, as set forth in the appended claims, by the specific reagents, operating conditions, concentrations, catalytic composites, etc., employed in these illustrative examples.

TEST METHOD

In these examples, reference is made to a "standard relative activity" test method. This test method results in a relative activity coefficient which may be employed to evaluate the catalyst, or other specific catalytic composites of varying compositions, or which have been prepared by different methods of manufacture. The relative activity coefficient of a particular catalytic composite is defined as the ratio of the space velocity required to result in a given product improvement, while employing the test catalyst, to that space velocity required to yield the same degree of product improvement while employing a primary, standard catalyst, which relative activity coefficient may be expressed as a percentage. The catalytic composite employed as the "standard" catalyst is an alumina-cobalt-molybdenum composite consisting of about 2.2% by weight of cobalt and 5.9% by weight of molybdenum, calculated as if existing within the composite as the elements. The product quality improvement is measured in terms of the residual basic nitrogen content of the liquid product; since the removal of nitrogen-containing compounds is that function of the catalyst which is most difficult to effect with most highly contaminated hydrorefining and/or hydrocracking charge stocks, the relative activity of a given catalyst is most logically based thereupon, rather than on the improvement in either the sulfur concentration or the quantity of unsaturated hydrocarbons in the liquid product effluent.

Briefly, the relative activity test method consists of processing a thermally-cracked, California naphtha in contact with a catalyst disposed within a reaction zone fabricated from one-inch, type 316 stainless steel. The cracked naphtha is characterized by a specific gravity, °API at 60° F., of 43.3, an initial volumetric distillation point of 290° F. and an end volumetric distillation point of 392° F. The naphtha is contaminated by 1.46% by weight of sulfur, 240 p.p.m. of nitrogen, and has a bromine number (representative of the degree of olefinic hydrocarbon concentration) of 61. The naphtha is passed into the reaction zone which is equipped with a thermocouple well to which perforated baffle plates are fastened to serve as the vaporization, preheating and mixing zone for the recycle hydrogen and the liquid hydrocarbon charge. The reaction zone contains a single catalyst bed of approximately 50 cubic centimeters, and is maintained under an imposed hydrogen pressure of 800 pounds per square inch, the hydrogen being recycled at a rate of 3000 s.c.f./bbl. of liquid charge; the inlet temperature to the catalyst bed, during the entire test procedure, is closely controlled at a level of 700° F. Three individual, separate test procedures are effected at various liquid hourly space velocities within the range of from about 2.0 to about 10.0. The liquid product, upon which product inspections are made, is collected over a period of operation of from about 4 to about 7 hours. The concentration of basic nitrogen in each of the three individual liquid products is plotted on a logarithmic scale against the reciprocal of the three space velocities utilized. From the resulting curve, a determination is made of the reciprocal of the space velocity required to yield a liquid product having a basic nitrogen content of 2.0 p.p.m. The relative activity of the test catalyst, in regard to the naphtha test, is derived from the ratio of the reciprocal space velocity to yield 2.0 p.p.m. of basic nitrogen, with respect to the standard catalyst, compared to that of the catalyst being tested. The ratio is multiplied by a factor of 100, and a relative activity coefficient greater than 100 indicates a test catalyst having a higher degree of activity than the standard catalyst; obviously, a catalytic composite having a relative activity coefficient less than 100 is less active than the standard catalyst. By this method, a valid comparison of a variety of catalytic composites, or a comparison of a regenerated catalyst with the fresh catalyst, or a comparison of various regenerated catalysts, may be made with respect to the activity thereof.

EXAMPLES

Example I

This example is presented for the purpose of illustrating the preferred method for the oxidative regeneration of a deactivated catalytic composite following the removal of metallic disulfides from the heater and heat-exchanger in accordance with the improvement encompassed by the present invention. The catalyst employed was a hydrorefining catalytic composite which had become deactivated in a commercial process designed and operated to remove large quantities of nitrogenous and sulfurous compounds from a hydrocarbon charge stock, and further to hydrogenate virtually completely the olefinic hydrocarbons contained therein. The catalyst was in the form of $\frac{1}{16}$-inch spheres of a carrier material comprising 88.0% by weight of alumina and 12.0% by weight of silica. The catalytic composite contained 0.05% by weight of cobalt, 4.2% by weight of nickel and 11.3% by weight of molybdenum, computed on the basis of the elemental metals. When initially prepared, this catalytic composite indicated a relative activity coefficient of about 285, in accordance with the standard relative activity test procedure hereinabove described, the deactivated catalyst possessing a relative activity coefficient of about 100. Upon analysis, the deactivated catalyst was found to be contaminated by about 6.1% by weight of coke and other carbonaceous material, calculated as carbon, and 6.15% by weight of sulfur, computed as the element.

A two-pound portion of the deactivated catalyst was subjected to regeneration at a regenerating gas temperature of 850° F. for a period of about two hours. The regenerating gas consisted of about 20.0% by volume of oxygen and 80.0% by volume of nitrogen, and contacted the deactivated catalyst at a gas hourly space velocity of 5,200. The gas hourly space velocity is defined as the volumes of regenerating gas per hour per volume of catalyst disposed within the regenerating zone. The relative activity coefficient, of the reactivated catalyst, was shown to have increased to 168, and analyses indicated the presence of 0.04% by weight of carbon and 0.06% by weight of sulfur.

A second portion of the deactivated catalyst was subjected to regeneration under the same conditions, and utilizing the same regenerating gas composition. However, the regeneration was effected in two stages; for the first one-half hour, the inlet temperature of the catalyst was maintained at a level of 850° F., followed by two hours of regeneration at an inlet temperature of 1150° F. The relative activity coefficient of this portion of regenerated catalyst was determined to be 187, and analyses indicated 0.009% by weight of carbon and 0.12% by weight of sulfur.

A third portion of the commercially deactivated catalyst was subjected to regeneration utilizing a regenerating gas mixture containing 4.0% by volume of oxygen and 96.0% by volume of nitrogen at a gas hourly space velocity of 4800. Regeneration was effected in two stages, first at a temperature of 850° F. for a period of one-half hour, followed by two hours at a temperature of 1150° F. The regenerated catalyst indicated a relative activity coefficient of 214, and analyses showed that the regenerated catalyst contained 0.25% by weight of carbon and 0.05% by weight of sulfur. From the foregoing described regeneration procedures, and the resulting activity coefficients, it is seen that the regeneration carried out in two stages, that is, at two different temperature levels, results in a catalytic composite having a significantly higher activity. It is further seen that substantially decreasing the content of oxygen within the regeneration gas stream has resulted in a catalytic composite having a still higher relative activity coefficient.

A fourth portion of the previously-described deactivated catalytic composite was regenerated at three different temperature levels, utilizing varying concentrations of oxygen within the regenerating gas, in accordance with the preferred oxidative regeneration procedure to be utilized in conjunction with the improvement of the present invention. The regenerating gas was continuously recycled through the catalytic composite, following removal of oxides of sulfur utilizing an aqueous solution of sodium hydroxide at a pH of about 7.5. Prior to being recycled, the regenerating gas was subjected to water-washing for the purpose of removing residual quantities of sodium hydroxide prior to passing the gas stream to contact with the catalytic composite. In this instance, the regenerating atmosphere consisted of 1.0% by volume of oxygen, the remainder being nitrogen, and the first temperature level was maintained at about 650° F. for a period of about three hours. The inlet temperature to the catalyst bed was increased to a level of about 825° F., the oxygen content remaining at about 1.0% by volume, these conditions being maintained for an additional period of about, one and one-half hours. The oxygen content was thereafter increased to a level of about 4.0% by volume, and the inlet temperature to the catalyst bed was increased to a level of about 1075° F., being maintained at this level for an additional four hours. Upon being subject to the relative activity test procedure, this regenerated catalyst indicated a relative activity coefficient of 266, and analyses showed that the catalyst was "nil" in carbon deposition, containing 0.12% by weight of sulfur.

Upon comparing the characteristics of the fourth portion of the regenerated catalyst, with those resulting from the first three portions of the catalyst, it is readily seen that the preferred method for use in the present invention produces a regenerated catalyst more closely approximating the fresh catalyst with respect to the activity thereof. Furthermore, the preferred method permits the use of a regenerating atmosphere which may be continuously recirculated through the catalytic composite without inducing adverse effects therein.

Example II

The catalyst employed in this illustration of the method of the present invention was a composite of an alumina-silica carrier material, in the form of $\frac{1}{16}$-inch spherical particles and containing 12.0% by weight of silica, and catalytically active metallic components of about 4.2% by weight of nickel, 0.05% by weight of cobalt and 16.0% by weight of molbdenum, computed as if the metals existed within the composite in the elemental state. Prior to use in the hydrorefining of a gas oil, this particular batch of catalyst indicated a relative activity coefficient, in accordance with the standard relative activity test procedure hereinbefore described, of 313. Two separate portions of this catalyst, in the amount of about 50 cc. each, were placed in individual reaction zones, and employed therein for the purpose of effecting the hydrorefining-hydrocracking of a highly contaminated vacuum gas oil. The hydrocarbon charge stock was admixed with hydrogen in an amount of about 3000 s.c.f./bbl., the mixture being heated to a temperature of about 750° F. prior to being introduced into the reaction zone in contact with the catalyst disposed therein. The total product effluent from the reaction zone passes through a heat-exchanger to raise the temperature of the fresh hydrocarbon charge stock, prior to admixing the latter with the recycled hydrogen-rich gas stream. The total product effluent then is passed into a high-pressure separator maintained at a pressure of about 1500 p.s.i.g. and a temperature of about 100° F., from which a hydrogen-rich gaseous phase is removed via compressive means to combine with fresh hydrocarbon charge prior to entering the charge heater.

Following a prolonged period of operation, an analysis of the catalyst portions indicated a relative activity coefficient of about 175, carbon deposition in an amount of about 11.8% by weight and sulfur deposition in an amount of 6.6% by weight. One portion of the catalyst was subjected to the preferred oxidative regeneration procedure as hereinbefore described. A regenerating gas stream, containing 1.0% of oxygen and the remainder nitrogen, was heated to a temperature of about 650° F. in the charge heater, and introduced into the reaction zone. The regenerating gas stream passed from the reaction zone, through the heat-exchanger and high-pressure separator, into a sodium hydroxide scrubber operated at a pH of about 7.5. After the passage of the first burning wave through the catalytic composite, in about one and one-half hours, the temperature of the regenerating gas was increased to a level of about 825° F., the oxygen content thereof remaining at 1.0%. After an additional period of about one and one-half hours, the concentration of oxygen increased to a level of 4.0%, and the temperature of the regenerating gas stream increased to a level of 1075° F. This concentration of oxygen, and temperature of the gas stream, was maintained for an additional period of four hours, after which the temperature of the gas stream was decreased to permit removal of the catalyst from the reaction zone. Upon analysis in accordance with the standard relative activity test procedure, the regenerated catalyst indicated a relative activity coefficient of about 188; further analysis of the regenerated catalyst showed the deposition of about 5.0% by weight of sulfate.

Prior to effecting the oxidative regeneration of the second portion of the catalyst, in accordance with the prefered method to be utilized in conjunction with the improvement of the present invention, the reaction zone was isolated from the remainder of the system by closing block valves at the inlet and outlet thereof. A temporary line was installed from the outlet of the charge heater to the inlet of the heat-exchanger, and from the outlet of the heat-exchanger into a temporary separator, the high-pressure separator utilized during the processing of the hydrocarbon charge stock also being blocked out of the system. Steam was introduced, at a pressure of about 100 to about 150 p.s.i.g., into the charge heater, the temperature in the latter being controlled at a level of about 1350° F. This initial purge of steam is for the purpose of removing loose particles of metallic disulfide scale from within the charge heater; during this period of purging with steam, the condensate in the temporary separator indicates a cloudy appearance. As the condensate appeared to become clear, air was introduced in admixture with the steam, the temperature within the charge heater being maintained at the aforesaid level of 1350° F. As burning of the metallic disulfide scale takes place, close control of the heater temperature is observed to insure that the same does not exceed 1400° F. Evidence of scale conversion, by burning, is determined by noting the exit gas stream from the temporary separator; the gas stream will exhibit a slightly brownish color, and the oxygen/nitrogen ratio decreases. The air-steam mixture is continued until such time as the exit gases are negative with respect to sulfur dioxide, and the condensate becomes clear.

When the exit gases indicate the absence of sulfur dioxide, the steam entering the charge heater is decreased while the temperature therein is reduced to a level below about 700° F., the air being continued to effect a substantial drying of the system. Air-flow is stopped when the temperature within the charge heater attains a level of about 650° F., and the reaction zone again being placed into open communication with the charge heater, the heat-exchanger and the high-pressure separator.

Oxidative regeneration of the catalytic composite was then effected by introducing 1.0% of oxygen in admixture with nitrogen, the regenerating gas stream passing through the catalyst into the high pressure separator, through the sodium hydroxide scrubber, being recycled by means of the compressor. As previously described, following the passing of a first burning wave through the catalytic composite, the temperature within the charge heater was increased to a level of about 825° F., the oxygen content of the regenerating gas stream being maintained at about 1.0%. When the second burning wave passed through the catalytic composite, the temperature within the charge heater was increased to a level of 1075° F., and the oxygen concentration of the gas stream was increased to a level of 4.0%. After a period of about four hours at the higher oxygen concentration and temperature level, the catalyst was cooled to permit removal of the same from the reaction zone for the purpose of analysis. When subjected to the standard relative activity test procedure, the catalytic composite regenerated in accordance with the mehod of the present invention indicated a relative activity coefficient of about 280, and further analysis showed only about 0.03% by weight of sulfur, indicating the substantial absence of sulfate deposition.

From the foregoing examples, it is readily ascertained that the improvement of the present invention, for use in conjunction with the oxidative regeneration of deactivated catalyst, results in a regenerated composite closely approximating the activity of the catalyst prior to use.

In many instances, especially with respect to commercial installations, and following a prolonged period of operation during which several catalyst regenerations have taken place incorporating the improvement hereinbefore described, the charge heater and heat-exchanger tubes are "acidized" to insure subsequent efficient operation thereof. The acidizing is effected as a matter of course generally in accordance with a pre-determined maintenance schedule. Although the technique is not applied only to those processes which may be described as "sulfur-service"—heaters attendant a catalytic reforming process are often acidized—a common characteristic involves the use of dilute hydrochloric acid. For obvious metallurgical reasons, concentrated acid is not untilized, and even the dilute acid is not permitted to contact the tubes for an extended time. In such situations, especially when the tubes being acidized have experienced prolonged service, traces of hydrogen sulfide are observed in the effluent. It is well known that dilute hydrochlorc acid does not attack the higher sulfides of iron ($FeS_2$, etc.), but will attack FeS. This is indicative that the controlled burning/flushing technique converts the tightly adhering disulfide scale to the loosely held FeS, the latter being capable of removal via flushing.

In many instances, it may be economically desirable not to attempt complete conversion of the metallic disulfide scale in the entire charge heater in one continuous flow of the air-steam mixture. In these cases, cycles of air and steam purging may be employed, each cycle increasing by periods of about fifteen minutes, until reaching approximately one hour. It has been found that the burning of the metallic disulfide scale, by the air-steam mixture has the tendency to effect additional loosening of the scaled deposits. Since it is relatively important to maintain the temperature within the charge heater at a level below about 1400° F., the air is intermittently cut out to permit a flushing of the thus-loosened scale through the use of the high-pressure steam.

I claim as my invention:

1. In a process for the oxidative regeneration of a deactivated, carbonized catalytic composite of a refractory inorganic oxide carrier material and at least one metallic component selected from the metals of Groups VI–B and VIII of the Periodic Table and compounds thereof, and contaminated by sulfur, which catalyst composite has become deactivated during use in a conversion process system comprising a reaction zont, containing said catalytic composite, and a charge heater in open communication with said zone upstream therefrom, said heater containing a scaled deposit of a metallic disulfide, the improvement which comprises the steps of:
   (a) isolating said reaction zone from said charge heater and raising the temperature within the latter to a level above about 1000° F.;
   (b) introducing steam into said heater and removing loose metallic disulfide scale therefrom;
   (c) admixing an oxygen-containing gas with said steam and burning said scaled metallic disulfide at a temperature in the range of about 1200° F. to 1400° F. to form metallic sulfide and sulfurous oxide, and flushing said metallic sulfide from said process system;
   (d) when said heater is substantially, completely free from deposits of scaled metallic disulfides, discontinuing the flow of steam therethrough while lowering the temperature thereof to below about 1000° F.;
   (e) after the temperature within said heater is below about 1000° F., discontinuing the flow of said oxygen-containing gas and placing said heater in open commmunication with said reaction zone;
   (f) oxidizing said catalytic composite with a circulating stream of regenerating gas containing free oxygen, and passing through said heater and said reaction zone; and,
   (g) treating the effluent regenerating gas to remove oxides of sulfur therefrom, recirculating the treated regenerating gas through said composite.

2. The improvement of claim 1 further characteried in that said regenerating gas contains free oxygen in an amount less than about 4.5 mol percent.

3. In a process for the oxidative regeneration of a deactivated carbonied catalytic composite of an alumina-containing carrier material and at least one metallic component selected from the metals of Groups VI–B and VIII of the Periodic Table and compounds thereof, and contaminated by sulfur, which catalytic composite has become deactivated during use in a conversion process system comprising a reaction zone, containing said catalytic composite, and a charge heater in open communication with said zone upstream therefrom, said heater containing a scaled deposit of iron disulfide, the improvement which comprises the steps of:
   (a) isolating said reaction zone from said charge heater and raising the temperature within the latter to a level within the range of from about 1200° F. to about 1400° F.;
   (b) introducing steam into said heater and removing loose iron disulfide scale therefrom;
   (c) admixing air with said steam and burning said scaled iron disulfide at a temperature in the range of about 1200° F. to about 1400° F. to form iron sulfide and sulfurous oxide, and flushing said iron sulfide from said process system;
   (d) when said heater is substantially, completely free from deposits of scaled iron disulfide, discontinuing the flow of steam therethrough while lowering the temperature thereof to below about 1000° F.;
   (e) after the temperature within said heater is below about 1000° F., discontinuing the flow of air and placing said heater in open communication with said reaction zone;
   (f) oxidizing said catalytic composite with a circulating stream of regenerating gas containing free oxygen in an amount less than about 4.5 mol percent and from about 0.5% to about 2% by weight of water vapor, said regenerating gas passing through said heater and said reaction zone; and,
   (g) treating the effluent regenerating gas to remove oxides of sulfur therefrom, recirculating the treated regenerating gas through said composite.

4. The process of claim 3 further characterized in that said carrier material is a composite of alumina and silica.

5. The process of claim 3 further characterized in that said catalystic composite is an alumina-silica carrier material containing molybdenum and an iron-group metallic component.

6. In a process for the oxidative regeneration of a deactivated, carbonized hydrorefining catalyst susceptible to loss of activity by sulfur and steam, which catalyst has become deactivated during use in a hydrorefining process system comprising a reaction zone, containing a bed of said catalyst, and a charge heater in open communication with said zone upstream therefrom, said heater containing a scaled deposit of a metallic disulfide, the improvement which comprises the steps of:
   (a) isolating said reaction zone from said charge heater;
   (b) passing a mixture of steam and an oxygen-containing gas through the heater, therein heating said mixture to a temperature in the range of about 1200° F. to about 1400° F., burning said scaled metallic disulfide at the last-mentioned temperature to form metallic sulfide and sulfurous oxide, and flushing said metallic sulfide from said process system;

(c) when said heater is substantially free from deposits of scaled metallic disulfide, discontinuing the flow of said mixture therethrough and placing the heater in open communication with said reaction zone; and (d) passing a stream of regenerating gas, consisting essentially of a mixture of free oxygen and an inert gas, through said heater, therein heating said stream to a temperature below about 1000° F. and passing the thus heated stream through said reaction zone to regenerate said catalyst.

7. The process of claim 6 wherein said metallic disulfide is iron disulfide.

8. The process of claim 6 wherein said oxygen-containing gas is air.

References Cited

UNITED STATES PATENTS

| 2,892,770 | 6/1959 | Coley et al. | 208—140 |
| 2,923,679 | 2/1960 | Thomson | 208—140 |
| 3,055,824 | 9/1962 | Squires et al. | 208—216 |
| 3,137,646 | 6/1964 | Capsuto | 208—140 |

FOREIGN PATENTS

| 744,459 | 2/1956 | Great Britain. |

PATRICK P. GARVIN, Primary Examiner

P. E. KONOPKA, Assistant Examiner

U.S. Cl. X.R.

23—225; 208—108, 111, 216, 217; 252—416, 420